Feb. 5, 1952      O. J. POUPITCH      2,584,812
DRIVE FASTENER
Filed June 19, 1947      2 SHEETS—SHEET 1
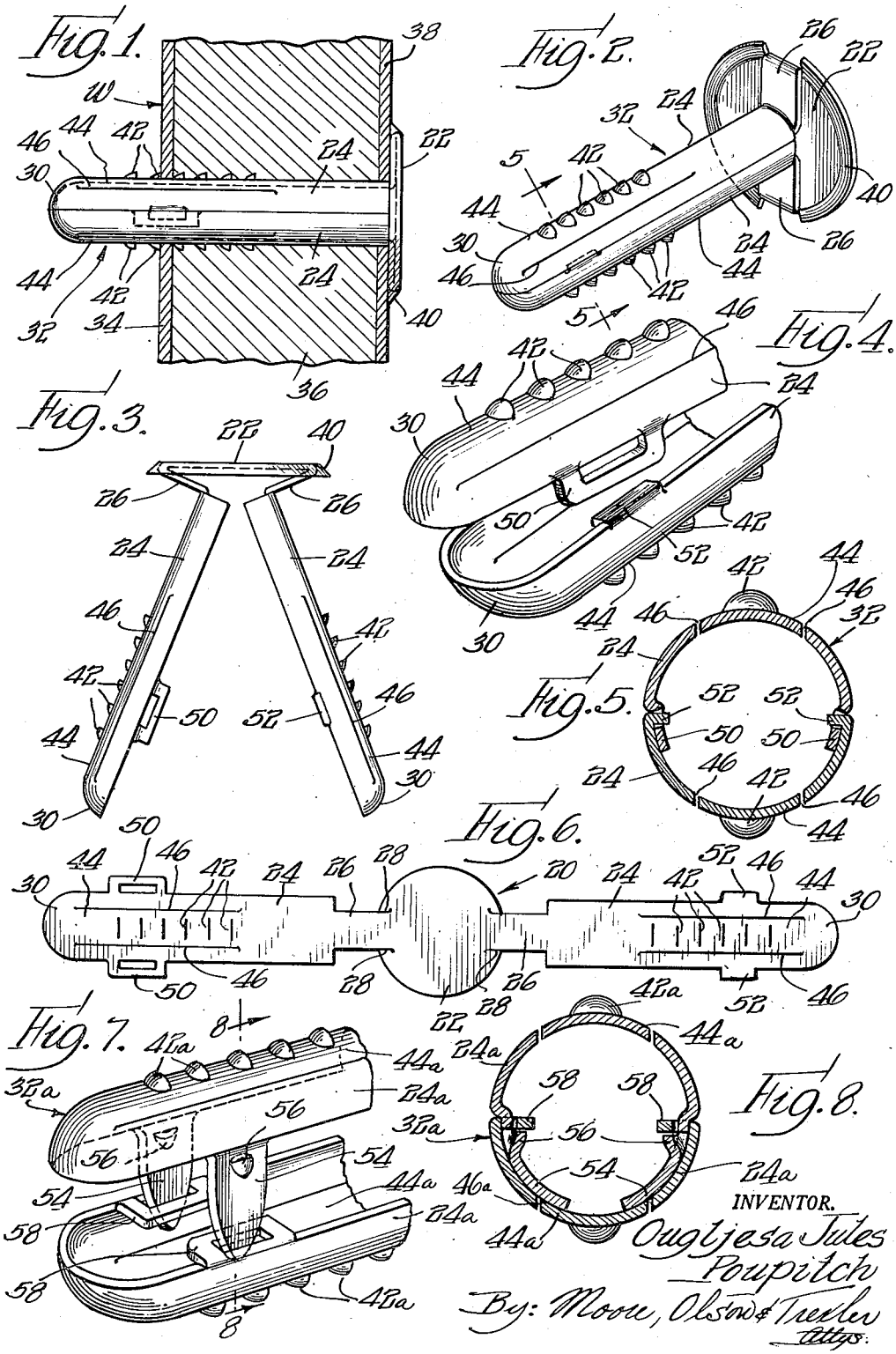
INVENTOR.
Ougljesa Jules Poupitch
By: Moore, Olson & Trexler
Attys.

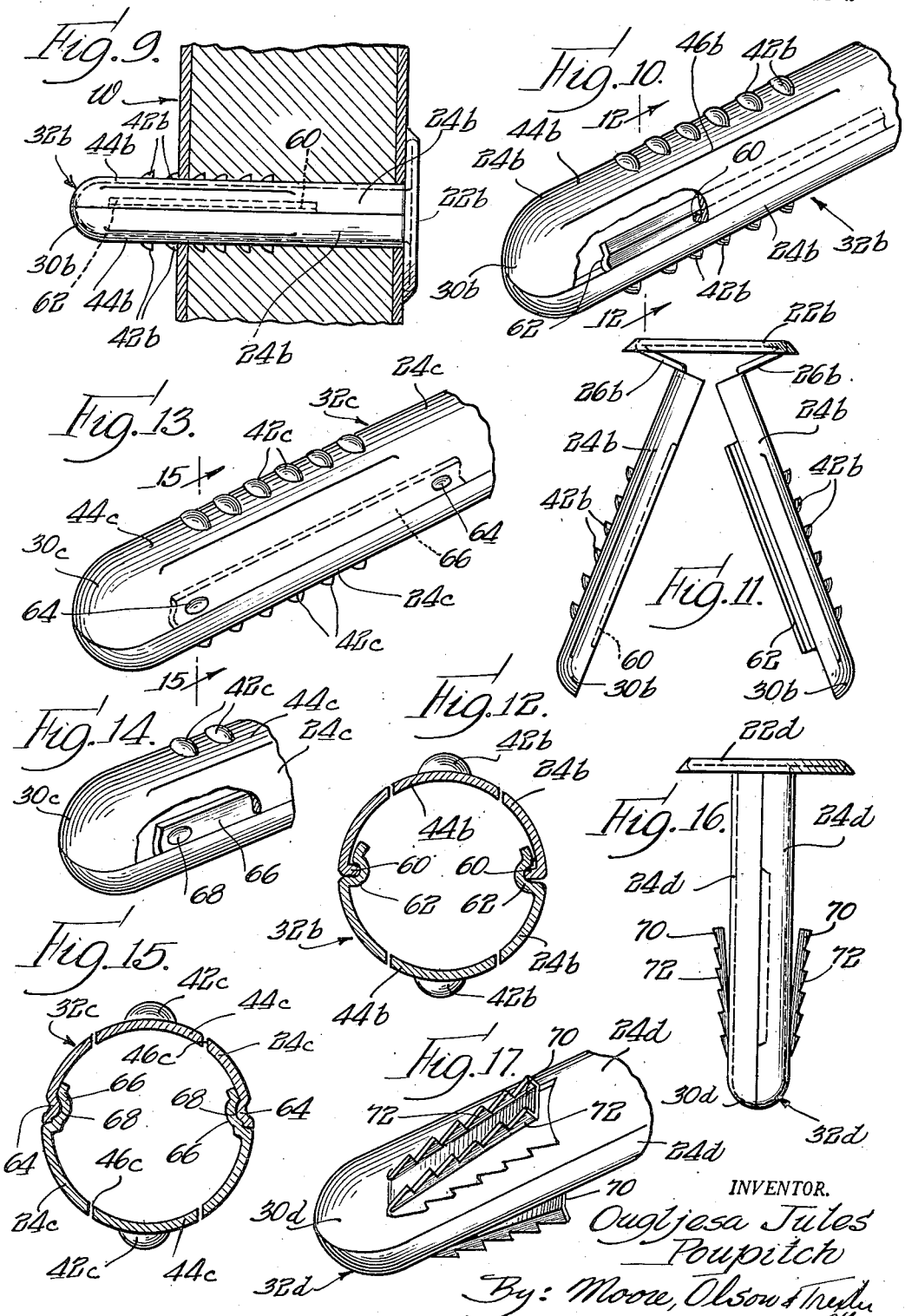

Patented Feb. 5, 1952

2,584,812

UNITED STATES PATENT OFFICE 2,584,812

DRIVE FASTENER

Ougljesa Jules Poupitch, Chicago, Ill., assignor to Illinois Tool Works, Chicago, Ill., a corporation of Illinois Application June 19, 1947, Serial No. 755,675

14 Claims. (Cl. 85—5)

This invention relates to fastening devices formed of sheet material, particularly of the type wherein the fastener is driven forcibly into a work aperture and is adapted to lock itself firmly in the work piece so that it does not loosen when subjected to vibration and stresses of a similar nature.

Drive fasteners are in widespread use as a means of rapidly and effectively mounting objects upon supporting bodies or securing together several layers or panels of material. In the automotive industry, for example, such fasteners are used extensively to mount objects such as radios on the dash panels of vehicles and for many other purposes. Drive fasteners are especially useful in situations where the work piece comprises superposed thicknesses of compressible and rigid materials.

It is desirable that the fasteners be so constituted as to seal the work apertures in which they are disposed against the entrance of dirt, oil and other matter into the interior of the vehicle. The shank of the fastener preferably should maintain a tubular shape conforming with the wall of the work aperture. It should be of sufficient rigidity so that it may be driven solidly into the work and yet be sufficiently yielding so as not to damage the work. Other desirable characteristics of the fastener are that it be adapted for use in work pieces of varying thickness with equal efficiency, that it be readily inserted into a work aperture but removed therefrom only with great difficulty, and that it be susceptible of manufacture cheaply by conventional stamping or forming operations.

An object of the present invention is to provide an improved drive fastener having all of the foregoing attributes.

A further object is to provide a novel drive fastener comprising a tubular shank formed of two complementary channel members which are rigidly held together in adjoining relation throughout their length, yieldable work-gripping sections sheared longitudinally from said channel members, and a head adapted to seat snugly on the work around the aperture therein.

A further object is to provide a drive fastener capable of being formed from a sheet metal blank having a tubular stud portion formed by bringing together two complementary halves of the stud that are respectively provided with latching means to retain the halves of the stud against relative movement during heat treating and other manufacturing operations and while the fastener is in use.

A further object is to provide an improved drive fastener having a rigid tubular shank conforming exactly with a work aperture and being divided along its length into two complementary halves, each of said halves being slit lengthwise to define resilient sections that are provided with rigid work-engaging protuberances.

A still further object is to provide an improved drive fastener of the aforesaid type in which the resilient work-gripping sections normally are flush with the adjoining portions of the stud or shank, being capable of flexing inwardly when the protuberances encounter a rigid wall in the work aperture, and an ancillary object is to adapt the fastener so that it is held in the work piece under longitudinal tension without subjecting the work-gripping sections to transverse tension.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Fig. 1 is a section through a work piece showing, in elevation, a drive fastener constructed in accordance with the principles of my invention;

Fig. 2 is a perspective view of the drive fastener shown in Fig. 1;

Fig. 3 is an elevational view of the drive fastener prior to completion of the forming process;

Fig. 4 is a fragmentary perspective view of the drive fastener showing the relative positions of certain parts just prior to the final forming operation, a particular type of latching means being illustrated therein;

Fig. 5 is a transverse section through the stud portion of the fastener taken on the line 5—5 in Fig. 2;

Fig. 6 is a plan view of the blank from which the drive fastener in Figs. 1 to 5 is formed;

Fig. 7 is a fragmentary perspective view of a modified form of drive fastener employing a different latching means;

Fig. 8 is a cross-sectional view taken on the line 8—8 in Fig. 7;

Fig. 9 is a view similar to Fig. 1 but showing still another embodiment of the invention;

Fig. 10 is a fragmentary perspective view of the fastener of Fig. 9;

Fig. 11 is an elevational view showing this fastener in a partially finished condition;

Fig. 12 is a transverse section on the line 12—12 in Fig. 10;

Fig. 13 is a fragmentary perspective view of a drive fastener similar to that shown in Fig. 10 but having a slightly different latching means;

Fig. 14 is a fragmentary perspective view similar to Fig. 13 except that a portion of the structure is broken away for clarity;

Fig. 15 is a transverse section on the line 15—15 in Fig. 13;

Fig. 16 shows, in elevation, yet another embodiment of the invention; and

Fig. 17 is a fragmentary perspective view of the embodiment of Fig. 16.

Referring to the embodiment shown in Figs. 1 to 6, the fastener is formed from a blank 20 (Fig. 6) of sheet material having a central disc-like portion 22, from which the head of the fastener is formed, and outwardly extending legs 24 which are shaped to provide complementary channel members as will be described subsequently. The legs 24 are connected to the head 22 by neck portions 26 which are extended for a slight distance into the head 22 by means of slits 28. In forming the fastener from the blank 20, the necks 26 are folded against the underside of the head 22 and are bent at right angles where they join the legs 24. Each of the legs 24 is shaped throughout most of its length as a semicylindrical channel member and terminates in a rounded nose 30 at its free end. The members 24 are brought together in edge-to-edge relation to afford a tubular shank or stud 32 extending from the head 22 axially thereof.

The stud 32 is completely closed throughout its length and has a diameter substantially equal to that of an aperture in the work piece W, Fig. 1, ino which the fastener is adapted to be driven. The rounded nose 30 serves to guide the fastener into the work aperture. In many instances the work piece W comprises alternate layers of rigid and compressible material. For example, there is a rigid panel 34, such as the dash of an automobile, an adjoining pad 36 of compressible material such as jute, and an outer layer or panel 38. The function of the drive fastener is to maintain all of these panels and layers secured together.

One of the features of the present invention is that the drive fastener effectively seals the work aperture so that dirt, oil, grit and other unwanted material cannot filter through it into the interior of the vehicle, for example. To this end, the head 22 is formed with a rim 40 of frustoconical or other suitable configuration which seats snugly on the interior face of the panel 38, being so formed as to compensate for the extra thickness of the neck 26. Moreover, as has been noted above, the stud 32 completely fills the aperture due to its cylindrical shape. The nose portions 30 of the legs 24 are held tightly together as the fastener is driven into the work so that the soft material of the pad 36 does not enter the interior of the stud 32.

The stud 32 preferably is of such length that the nose 30 thereof protrudes from the reverse or exterior surface of the work W, Fig. 1. Lugs, teeth or other protuberances 42 are provided on diametrically opposite portions of the legs 24 for gripping the work. In the formation of the stud 32 a section 44 of each leg 24 is sheared longitudinally as indicated by the parallel slits 46, Fig. 6, extending lengthwise of each leg 24 within the margins thereof. Where the fastener is formed of relatively thin stock, the sections 44 may be sheared while the legs 24 are flat; otherwise it may be preferable to round the legs 24 prior to shearing the sections 44 therefrom. The teeth 42 are stamped from the material in the sections 44. A series of such teeth 42 is formed in longitudinal spaced relation on each leg 24 for selective engagement with the exterior surface of the work W as shown in Fig. 1, depending upon the thickness of the work. These teeth 42 are rigid, but the sections 44 have sufficient resiliency to yield inwardly when the teeth 42 encounter a wall of an aperture in a rigid plate or panel such as 34. Both ends of each yieldable or flexible section 44 are integral with the stock forming the leg 24, thereby anchoring the section 44 at each end thereof. Each section 44 exclusive of the teeth 42 normally is flush with the adjoining portions of the channel member or leg 24.

The fastener is pushed or driven through the work aperture until the head 22 seats on the interior surface and a pair of transversely aligned teeth 42 seats on the exterior surface of the work, the compressible material 36 yielding sufficiently to permit such selective engagement of the teeth 42 and the panel 34. Preferably the longitudinal spacing between successive teeth 42 is greater than the thickness of a work panel such as 34, so that the sections 44 are disposed in transversely untensioned relation when the drive fastener is mounted in the work piece W as shown in Fig. 1. It should be understood, however, that the invention is not limited to this exact relation of the fastener to the work inasmuch as there may conceivably be instances where the fastener is retained in the work solely by virtue of the teeth as 42 gripping the wall of the aperture without any of the teeth being seated on the surface of a panel as 34.

It is highly desirable that the stud 32 maintain a circular configuration in cross section and that the two legs 24 be exactly matched throughout substantially the entire length of the stud. Accordingly I have provided means to insure that the legs 24 are held firmly in matching edge to edge relation at all times, once the fastener is fabricated. Referring particularly to Figs. 3, 4 and 5, one of the legs 24 is formed with a pair of catches 50 respectively extending from the longitudinal edges of the leg, whereas the other leg 24 is provided with complementary tabs or dogs 52 adapted to be received by the catches 50. It will be understood that additional catches and cooperating tabs may be provided, if desired. When the two legs 24 are brought together as illustrated in Fig. 4, the tabs 52 seat in the catches 50 and securely lock the two halves of the stud together against relative transverse or longitudinal displacement thereof. This operation is performed prior to the heat treatment of the drive fastener so that the finish drive fastener is, in effect, a rigid unitary device except for the slight resiliency of the yieldable sections 44.

In Figs. 7 and 8 there is illustrated a portion of a drive fastener similar in construction to that shown in the preceding views (the corresponding parts being identified by similar reference numerals) except that a modified form of latching means is employed. One of the legs 24a is provided with tabs or ears 54 having locking projections 56 punched or stamped therefrom. The tabs 54 are inserted in catches 58 provided on the other leg 24a, and as the legs 24a are snapped together, the ends of the tabs 54 curl inwardly to conform with the interior surface of said other leg as shown in Fig. 8. The projections 56 spring inwardly to grip the catches 58 as shown. This arrangement securely locks the legs 24a of the stud 32a together so that the adjoining edges of the legs 24a are maintained in matching relation at all times.

In Figs. 9 to 12 there is illustrated an embodiment including still another type of latching means. One of the legs 24b of the stud 32b is formed with an inwardly directed lip or flange 60 extending along a considerable portion of each longitudinal edge thereof. The other leg 24b has along each edge thereof a resilient, grooved flange or rib 62 which is adapted to catch the lip 60 when the stud 32b is assembled. This arrangement insures continuous edge-to-edge contact of the legs 24b throughout the length of the stud 32b. The fastener functions in the same manner as the previously described embodiments.

If desired, the latching means of Figs. 9 to 12 may be replaced by one such as shown in Figs. 13 to 15, wherein dimples 64 are formed on one leg 24c of the stud 32c. The other leg 24c is provided with an inwardly offset flange 66 having indentations 68 therein which are complementary to the dimples 64. When the legs 24c are snapped shut, the dimples 64 seat in the indentations 68 as shown. The flange 66 reinforces the stud 32c at the seam.

In Figs. 16 and 17, there is shown a modified drive fastener in which locking sections or wings 70 are provided respectively on the legs 24d of the stud 32d. Each section 70 is sheared on its longitudinal edges and one transverse edge thereof from the respective leg 24d so that the section 70 is connected to the leg 24d only at the end of the section which is nearest the nose 30d. The longitudinal edges of each section 70 are bent up to provide perpendicular flanges 72 which are serrated or notched. Preferably the wings 70 are spread outwardly to some extent in their normal positions as indicated. When the fastener is inserted in the work aperture, the wings 70 will flex to permit passage of the stud 32d through the aperture causing the teeth 72 to be urged into engagement with the work. Any suitable latching means as above described may be employed to hold the two halves of the stud together. This form of fastener may be employed to advantage in situations where substantially perfect sealing action is not a primary requirement.

The various forms of drive fastener herein disclosed are characterized by the advantages set forth in the above-stated objects. The fastener is simple and rugged in construction and highly dependable in service. It functions effectively to seal the work aperture and to retain objects mounted on or secured to the work piece against vibratory and other effects which tend to loosen ordinary fastening devices. Such a device also is proof against unauthorized tampering. Extremely satisfactory results have been obtained with these fasteners under actual conditions of test and service.

It is obvious that various changes may be made in the specific embodiments set forth for purposes of illustration without departing from the spirit of the invention. Hence, the invention is not limited to the specific embodiments shown and described, but only as indicated in the following claims.

The invention is hereby claimed as follows:

1. A one-piece drive fastener formed of sheet material and comprising two elongated channel-shaped members arranged in complementary relation to provide a tubular stud portion, a longitudinally sheared section on at least one of said channel members capable of being flexed inwardly relative to such member, said section being presented between a pair of longitudinal slits, the extremities of said slits terminating short of the opposite ends of the tubular stud portion, a head on said stud portion adapted to engage a surface of an apertured work piece into which the fastener is inserted, and work-engaging protuberances disposed on said flexible sheared section and on the diametrically opposite portion of the other channel member.

2. A one-piece drive fastener formed of sheet material and comprising two elongated channel-shaped members arranged in matching edge-to-edge relation to provide a tubular stud portion, a longitudinally sheared section on at least one of said channel members capable of being flexed inwardly relative to such member, said section being presented between a pair of longitudinal slits, the extremities of said slits terminating short of the opposite ends of the tubular stud portion, a head on said stud portion adapted to engage a surface of an apertured work piece into which the fastener is inserted, and longitudinally spaced work-engaging protuberances disposed on said flexible sheared section and on the diametrically opposite portion of the other channel member, said flexible sheared section being substantially flush with the adjoining portions of said one channel member when in an untensioned condition.

3. A one-piece drive fastener formed of sheet material and comprising a rigid tubular shank for insertion in an apertured work piece, said shank being divided lengthwise into two axially extending halves each having a pair of longitudinally extending slits therein defining a resilient section capable of being flexed inwardly, said slits terminating short of the opposite ends of said tubular shank, a series of longitudinally spaced work-engaging protuberances on each of said flexible sections, and a head at one end of said shank adapted for engagement with one surface of the work piece.

4. A one-piece drive fastener formed of sheet material and comprising a head, a rigid stud extending from said head and consisting of two channel-shaped legs adapted to meet in edge-to-edge contact, latching means integral with said legs positioned internally of said stud to secure said legs against lateral separation and relative transverse shifting, resilient sections respectively sheared longitudinally from said channel members and capable of flexing inwardly relative thereto, each of said resilient sections being defined by a pair of spaced parallel slits terminating short of the opposite extremities of the stud, and rigid teeth formed on said resilient sections for engagement with the work.

5. A one-piece sealing drive fastener formed of sheet material and comprising a head, and a closed tubular portion extending from said head and including two complementary channel-shaped members meeting in continuous edge-to-edge contact to form a shank adapted for insertion into a work aperture of comparable size, snap fastening means on said channel members to latch said members against lateral separation, at least one of said members having two slits therein parallel to its longitudinal edges and terminating short of the opposite extremities of the tubular portion to define a resilient section, and longitudinally spaced work-gripping protuberances on said resilient section and on the diametrically opposite portion of said shank.

6. A drive fastener as set forth in claim 5, wherein said snap fastening means comprises complementary tabs and catches to inhibit both longitudinal and transverse displacement of said channel members relative to each other.

7. A drive fastener as set forth in claim 5, wherein said snap fastening means comprises grooved flanges and complementary lips received therein, said flanges and lips being disposed respectively on the longitudinal edges of said channel members.

8. A drive fastener as set forth in claim 5, wherein said snap fastening means comprises dimples and complementally indented flanges disposed respectively on the longitudinal edge portions of said channel members.

9. A drive fastener comprising a strip of sheet material bent adjacent its midportion to provide a solid head, leg portions extending in parallel abutting relation from said head and being convexed to provide a tubular shank, resilient longitudinal strips respectively disposed on said legs, each of said strips being anchored at two opposite ends thereof to the respective leg so as to present an intermediate laterally yieldable section, and a series of longitudinally spaced lugs on each of said strips adapted to engage the wall of a work aperture upon insertion of the fastener therein.

10. A one-piece sealing drive fastener formed of sheet material and comprising a head, and a closed tubular portion extending from said head and including two complementary channel-shaped members meeting in continuous edge-to-edge contact to form a shank adapted for insertion into a work aperture, the forward ends of said channel members being reduced in diameter to provide a nose for said shank, fastening means on said shank to hold said members against lateral separation and relative transverse shifting, each of said members having two slits therein parallel to its longitudinal edges to define a resilient section, and longitudinally spaced work-engaging protuberances on each of said resilient sections.

11. A one-piece drive fastener formed from a sheet metal blank and comprising a head, a rigid tubular stud extending from said head and consisting of two complementary channel shaped legs meeting in substantially straight line edge-to-edge contact, at least one of said channel-shaped legs having spaced longitudinal slits terminating short of the opposite ends thereof and providing a resilient section, latching means integral with said legs to prevent lateral separation and relative transverse shifting thereof once the fastener is assembled, and yieldable work-gripping sections within said slits on said resilient section.

12. A one-piece sheet metal drive fastener for use with apertured work pieces comprising a head and two channel-shaped legs attached to said head and adapted to meet in substantially straight line edge to edge contact to provide a tubular shank, nose portions formed on the ends of said channel-shaped legs disposed away from said head to close the end of the shank, said channel-shaped legs having longitudinal slits terminating short of the ends thereof and providing resilient sections therebetween work piece engaging protuberances formed on said resilient sections to hold the fastener in fastening position in an apertured work piece, and latching means integral with said legs and positioned within the inner peripheral confines of said shank for holding said channel-shaped legs against lateral and longitudinal separation.

13. A drive fastener as set forth in claim 12, wherein the latching means comprises complementary tabs and catches.

14. A drive fastener as set forth in claim 12, wherein said latching means comprises indentations and complementary projections disposed on the longitudinal side edges of the channel-shaped legs.

OUGLJESA JULES POUPITCH.

REFERENCES CITED

The following references are of record in the file of this patent:

UNITED STATES PATENTS

| Number | Name | Date |
| --- | --- | --- |
| Des. 140,619 | Teague | Mar. 20, 1945 |
| 905,414 | Ette | Dec. 1, 1908 |
| 1,752,752 | Ogden | Apr. 1, 1930 |
| 2,006,813 | Norwood | July 2, 1935 |
| 2,041,336 | Hall | May 19, 1936 |
| 2,085,054 | Trevisan | June 29, 1937 |
| 2,244,976 | Tinnerman | June 10, 1941 |
| 2,267,873 | Place | Dec. 30, 1941 |
| 2,329,442 | Popp | Sept. 14, 1943 |
| 2,391,298 | Davis | Dec. 18, 1945 |
| 2,543,212 | Waara | Feb. 27, 1951 |